United States Patent
Djordjevic et al.

(10) Patent No.: US 8,950,117 B2
(45) Date of Patent: Feb. 10, 2015

(54) DRIVE ASSEMBLY FOR POWER SLIDING DOOR FOR VEHICLE

(75) Inventors: Nebojsa Djordjevic, Toronto (CA); Kristopher B. Rogers, Etobicoke (CA)

(73) Assignee: Magna Closures Inc., Newmarket, Ontario (CA)

( * ) Notice: Subject to any disclaimer, the term of this patent is extended or adjusted under 35 U.S.C. 154(b) by 0 days.

(21) Appl. No.: 13/983,322

(22) PCT Filed: Feb. 27, 2012

(86) PCT No.: PCT/CA2012/000177
§ 371 (c)(1),
(2), (4) Date: Aug. 2, 2013

(87) PCT Pub. No.: WO2012/113071
PCT Pub. Date: Aug. 30, 2012

(65) Prior Publication Data
US 2013/0326957 A1    Dec. 12, 2013

Related U.S. Application Data

(60) Provisional application No. 61/446,614, filed on Feb. 25, 2011.

(51) Int. Cl.
*E05F 15/20* (2006.01)
*E05F 15/14* (2006.01)

(52) U.S. Cl.
CPC ............. *E05F 15/20* (2013.01); *E05F 15/146* (2013.01); *E05F 15/14* (2013.01); *E05F 15/145* (2013.01);

(Continued)

(58) Field of Classification Search
CPC ............... E05Y 2201/654; E05Y 2201/664; E05Y 2900/531; E05F 15/146
USPC ............... 49/360, 324, 352; 296/146.4, 155
See application file for complete search history.

(56) References Cited

U.S. PATENT DOCUMENTS 4,534,233 A * 8/1985 Hamaguchi .............. 74/89.2
4,678,135 A    7/1987 Jones
(Continued)

FOREIGN PATENT DOCUMENTS

EP    546297 A1    6/1993
EP    1422375 A1   5/2004

OTHER PUBLICATIONS

International Search Report mailed May 12, 2012 (PCT/CA2012/000177).

*Primary Examiner* — Katherine Mitchell
*Assistant Examiner* — Justin Rephann
(74) *Attorney, Agent, or Firm* — Dickinson Wright PLLC

(57) ABSTRACT

A sliding door drive assembly is provided for a vehicle. The assembly includes at least one grooveless drum. The drum has a cable wrap surface and is rotatable to wind cable thereon and unwind cable therefrom. A guide is positioned to be aligned generally with a first axial edge of the cable wrap surface. As cable is wrapped on the drum, the angle of the cable (due to the position of the guide) biases the cable towards the first axial edge, so that successive wraps of cable are snuggly positioned adjacent prior wraps. In another aspect, a cable drum includes a ramp at a second axial edge of the cable wrap surface, which guides the cable radially outwardly to start a second layer of wraps of cable on the first layer of wraps. In another aspect, an absolute position sensor is provided for a powered sliding door.

10 Claims, 13 Drawing Sheets

(52) U.S. Cl.
CPC ...... *E05Y 2201/638* (2013.01); *E05Y 2201/664* (2013.01); *E05Y 2400/322* (2013.01); *E05Y 2800/21* (2013.01); *E05Y 2900/531* (2013.01); *E05Y 2600/458* (2013.01)
USPC ............................................ 49/360; 49/324

(56) References Cited

U.S. PATENT DOCUMENTS

| | | | | |
|---|---|---|---|---|
| 5,046,283 | A * | 9/1991 | Compeau et al. | 49/138 |
| 5,323,570 | A * | 6/1994 | Kuhlman et al. | 49/360 |
| 5,992,919 | A * | 11/1999 | Menke | 296/155 |
| 6,032,415 | A * | 3/2000 | Tajima | 49/28 |
| 6,038,818 | A * | 3/2000 | Haag et al. | 49/360 |
| 6,179,742 | B1 * | 1/2001 | Haag et al. | 475/154 |
| 6,198,242 | B1 * | 3/2001 | Yokomori et al. | 318/445 |
| 6,390,535 | B1 * | 5/2002 | Chapman | 296/155 |
| 6,918,209 | B2 * | 7/2005 | Regnier et al. | 49/352 |
| 6,925,757 | B2 * | 8/2005 | Priest et al. | 49/360 |
| 7,025,298 | B2 * | 4/2006 | Priest et al. | 242/388.8 |
| 7,627,990 | B2 * | 12/2009 | Yokomori et al. | 49/360 |
| 7,637,360 | B2 * | 12/2009 | Carlson et al. | 188/267.2 |
| 7,823,330 | B2 * | 11/2010 | Ostrowski et al. | 49/360 |
| 2005/0253414 | A1 * | 11/2005 | Yokomori | 296/146.4 |
| 2006/0225358 | A1 * | 10/2006 | Haag et al. | 49/360 |
| 2007/0176463 | A1 * | 8/2007 | Averitt | 296/146.4 |
| 2008/0083168 | A1 * | 4/2008 | Booth et al. | 49/360 |
| 2008/0190028 | A1 * | 8/2008 | Oxley | 49/360 |
| 2009/0173011 | A1 * | 7/2009 | Kita et al. | 49/349 |
| 2010/0043296 | A1 * | 2/2010 | Oxley | 49/360 |
| 2010/0122881 | A1 * | 5/2010 | Carlson et al. | 188/267 |
| 2010/0180508 | A1 * | 7/2010 | Yamaguchi et al. | 49/358 |
| 2013/0333290 | A1 * | 12/2013 | Ishigaki et al. | 49/349 |

* cited by examiner

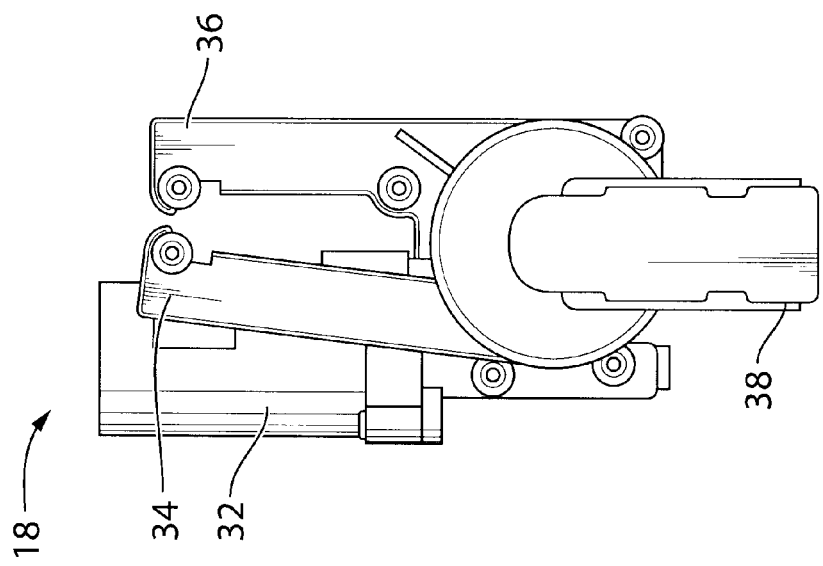
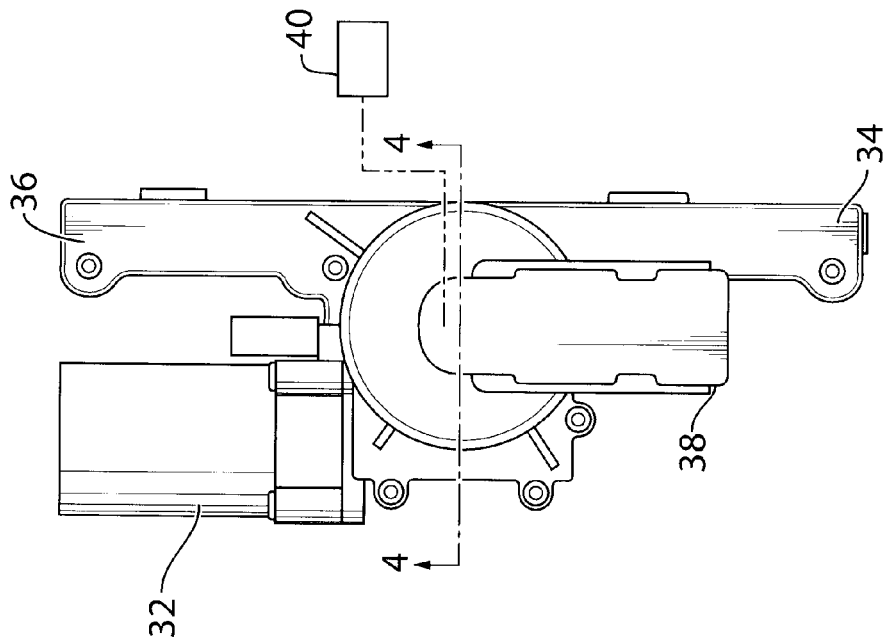

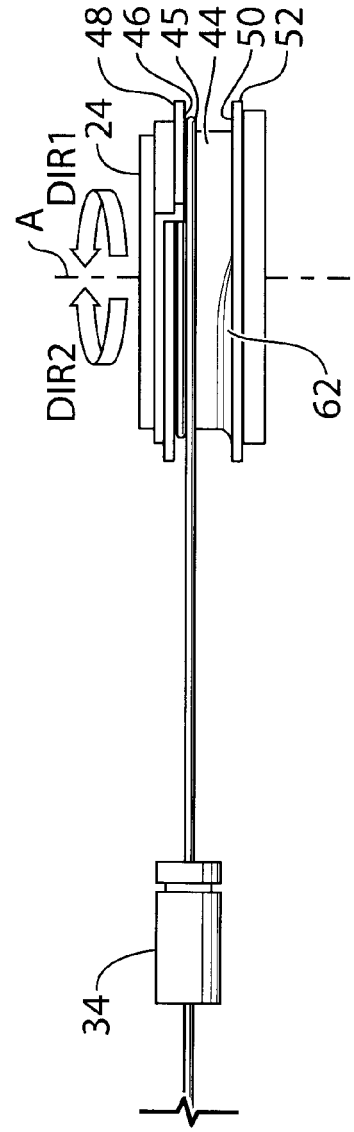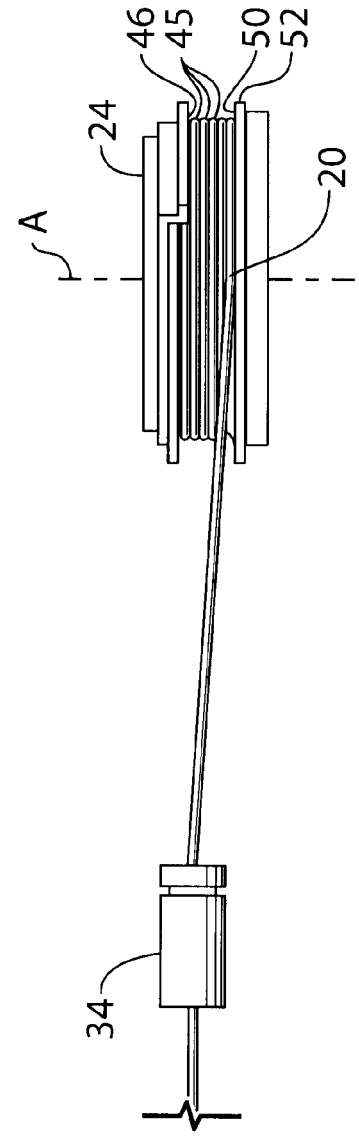

DRIVE ASSEMBLY FOR POWER SLIDING DOOR FOR VEHICLE

CROSS-REFERENCE TO RELATED APPLICATIONS

This application claims priority from U.S. Provisional Patent Application No. 61/446,614, filed Feb. 25, 2011, the contents of which are incorporated herein in their entirety.

FIELD OF THE INVENTION

The present inventions relates to vehicle sliding doors in one aspect, and to position sensing for rotating members in another aspect.

BACKGROUND OF THE INVENTION

Power sliding doors are a useful feature on minivans and the like. In some instances, however, the mechanisms that drive the movement of the sliding doors are unnecessarily large. In vehicles, and in vehicle doors in particular, it is advantageous to reduce the size of any components, such as the aforementioned drive mechanisms for moving the sliding doors.

The position sensors for such doors sometimes include a Hall effect sensor that acts as a rotation counter for the drive motor of the door. The Hall effect sensor is a relative position sensor however, and can only provide information regarding the position of the door relative to an initial position, based on the number of rotations of the drive motor that take place while moving the door. The rotation count may be stored in volatile memory. During operation of power sliding doors it can occur, however, that the door is stopped in a partially open position while power to the controller for the door is stopped. In such a situation, the rotation count from the sensor would no longer be stored in memory. As a result, when power is restored to the controller, the controller cannot establish the position of the door. It would be beneficial to provide a sensor that provides the absolute position of the door, so that the controller can determine the position of a partially open door after the power is returned to the controller.

SUMMARY OF THE INVENTION

In a first aspect, the invention is directed to a sliding door drive assembly for a motor vehicle with a sliding door and a vehicle body. The sliding door drive assembly includes first and second drums at least one of which is grooveless. The grooveless drum has a cable wrap surface and is rotatable about an axis to wind cable thereon and unwind cable therefrom so as to drive the door between an open position and a closed position. A cable guide is positioned so as to be aligned generally with a first axial edge of the cable wrap surface. As a cable segment is wrapped on the grooveless drum, the angle of the cable (due to the position of the cable guide) biases the cable segment towards the first axial edge, so that successive wraps of the cable are snuggly positioned adjacent prior wraps of the cable.

In a specific embodiment of the first aspect, the drive assembly includes a motor, a first cable drum and a second cable drum. The first cable drum is rotatable by the motor about an axis and has a cable wrap surface for receiving a first cable segment thereon. The cable wrap surface is ungrooved and has a first axial edge and a second axial edge. The drive assembly further includes a first cable guide oriented generally perpendicularly to the axis and positioned to bias any of the first cable segment passing therethrough towards the first axial edge of the cable wrap surface. The second cable drum is rotatable by the motor. The second cable drum is positioned to receive a second cable segment, wherein the first and second cable drums are mountable to one of the sliding door and the vehicle body. A free end of each of the first and second cable segments is mountable to the other of the sliding door and the vehicle body, so that rotation of the motor drives the rotation of the first and second drums which in turn drives the sliding door to move relative to the vehicle body.

In a second aspect, the invention is directed to a position sensor for detecting the angular position of a rotating member that is rotatable about an axis, including sensor drive surface that extends axially and is connected to the rotating member; and a first sensor element and a second sensor element. The first sensor element is stationary. The second sensor element is drivable through a range of positions by the sensor drive surface. The first sensor element is configured to send signals to a control system that are indicative of the position of the second sensor element. In an embodiment, the position sensor is used to determine the position of a first cable drum used in a drive assembly for driving a vehicle sliding door between open and closed positions.

In a third aspect, the invention is directed to a sliding door drive assembly for a motor vehicle with a sliding door and a vehicle body. The sliding door drive assembly includes first and second drums. The first drum includes a cable wrap surface and is rotatable about an axis to wind cable thereon and unwind cable therefrom so as to drive the door between an open position and a closed position. As cable is wound around the cable wrap surface it forms a first layer. The first cable drum includes a ramp at the second axial edge of the cable wrap surface, which guides the cable radially outwardly to start a second layer of wraps of cable on the first layer of wraps.

In a specific embodiment of the first aspect, the drive assembly includes a motor, a first cable drum that is rotatable by the motor about an axis, and that has a cable wrap surface for receiving a first cable segment thereon. A first cable drum ramp is provided at an axial edge of the cable wrap surface and is positioned to guide a wrap of the first cable segment radially above the cable wrap surface and onto a layer of wraps of the first cable segment on the cable wrap surface. The drive assembly further includes a second cable drum that is rotatable by the motor. The second cable drum is positioned to receive a second cable segment. The first and second cable drums are mountable to one of the sliding door and the vehicle body. A free end of each of the first and second cable segments is mountable to the other of the sliding door and the vehicle body, so that rotation of the motor drives the rotation of the first and second drums which in turn drives the sliding door to move relative to the vehicle body.

BRIEF DESCRIPTION OF THE DRAWINGS

The present disclosure will now be described, by way of example only, with reference to the attached drawings, in which:

FIG. 3B is a side view of a variant of the sliding door drive assembly shown in FIG. 3A;

FIG. 3C is a side view of the sliding door drive assembly shown in FIG. 2;

FIGS. 6A and 6B are edge views of the first cable drum at different stages of being wrapped by a first cable segment;

DETAILED DESCRIPTION OF THE INVENTION

Figure 1:
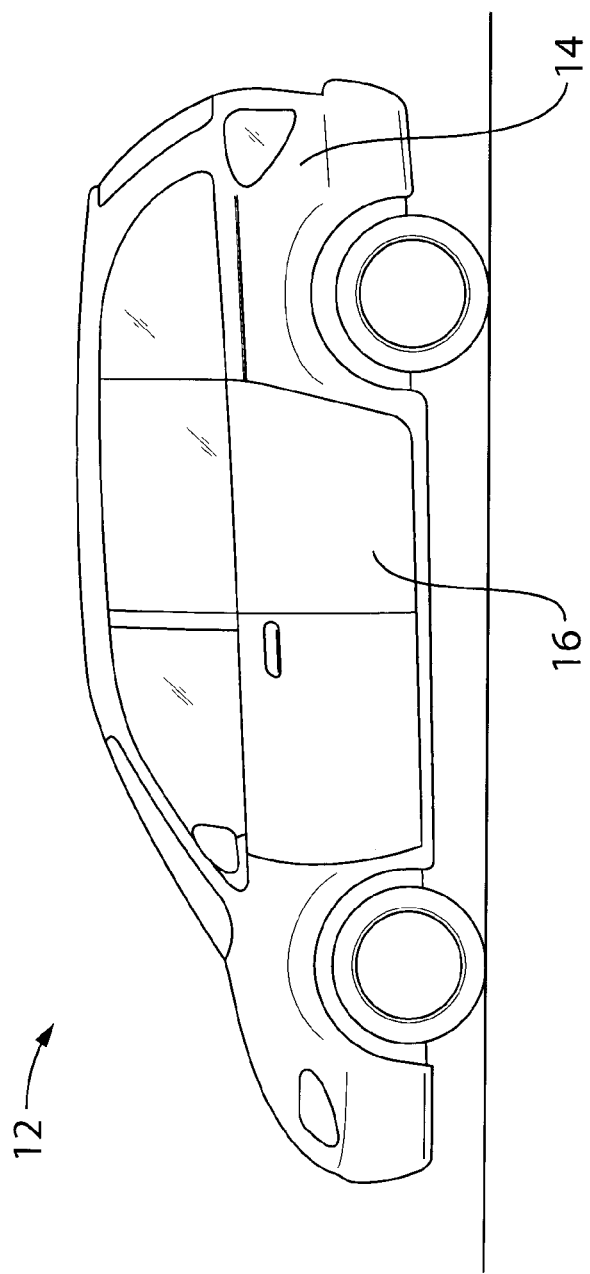
FIG. 1 is a side view of a vehicle that includes a sliding door in accordance with an embodiment of the present invention.
Figure 2:
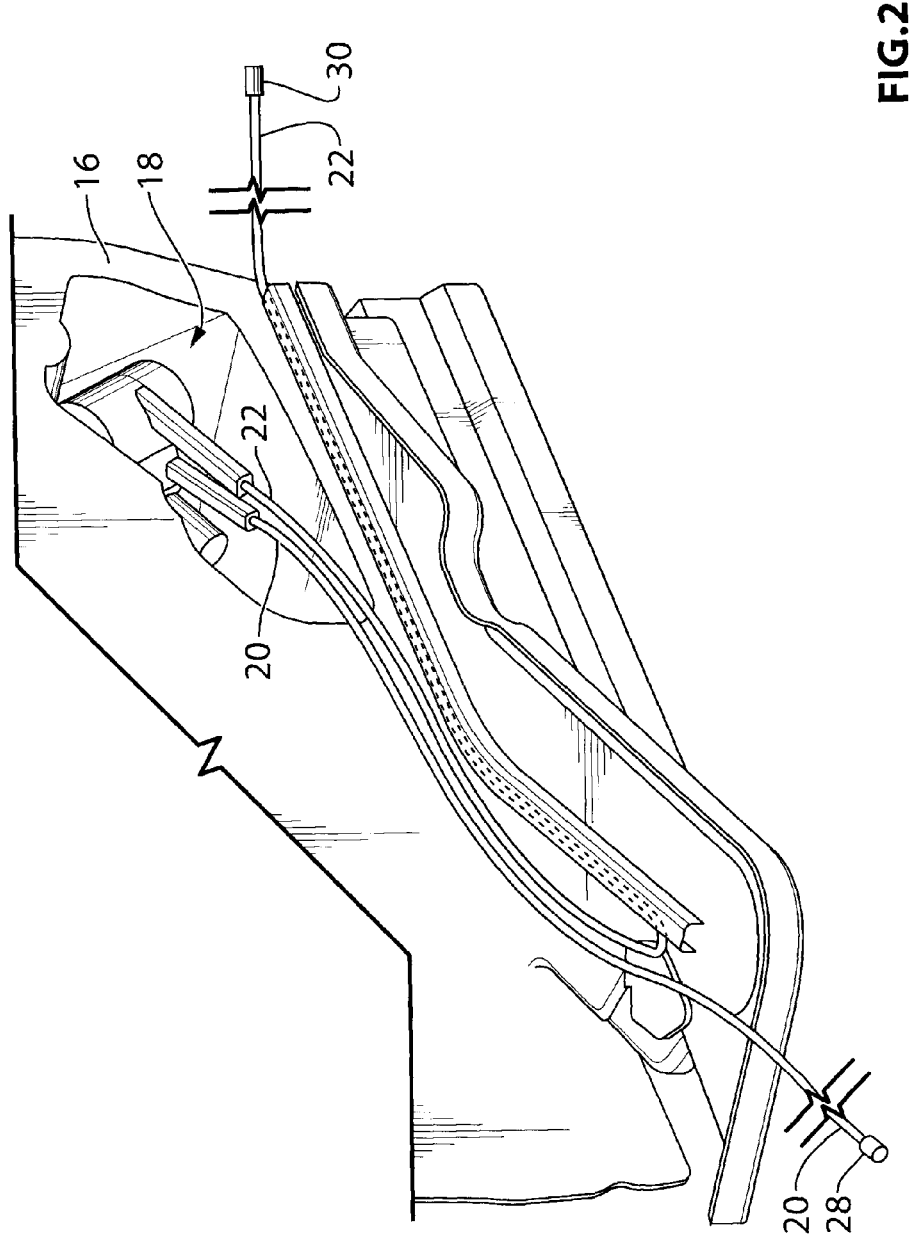
FIG. 2 is a perspective view of the sliding door and a sliding door drive assembly for the vehicle shown FIG. 1.
Figure 3A:
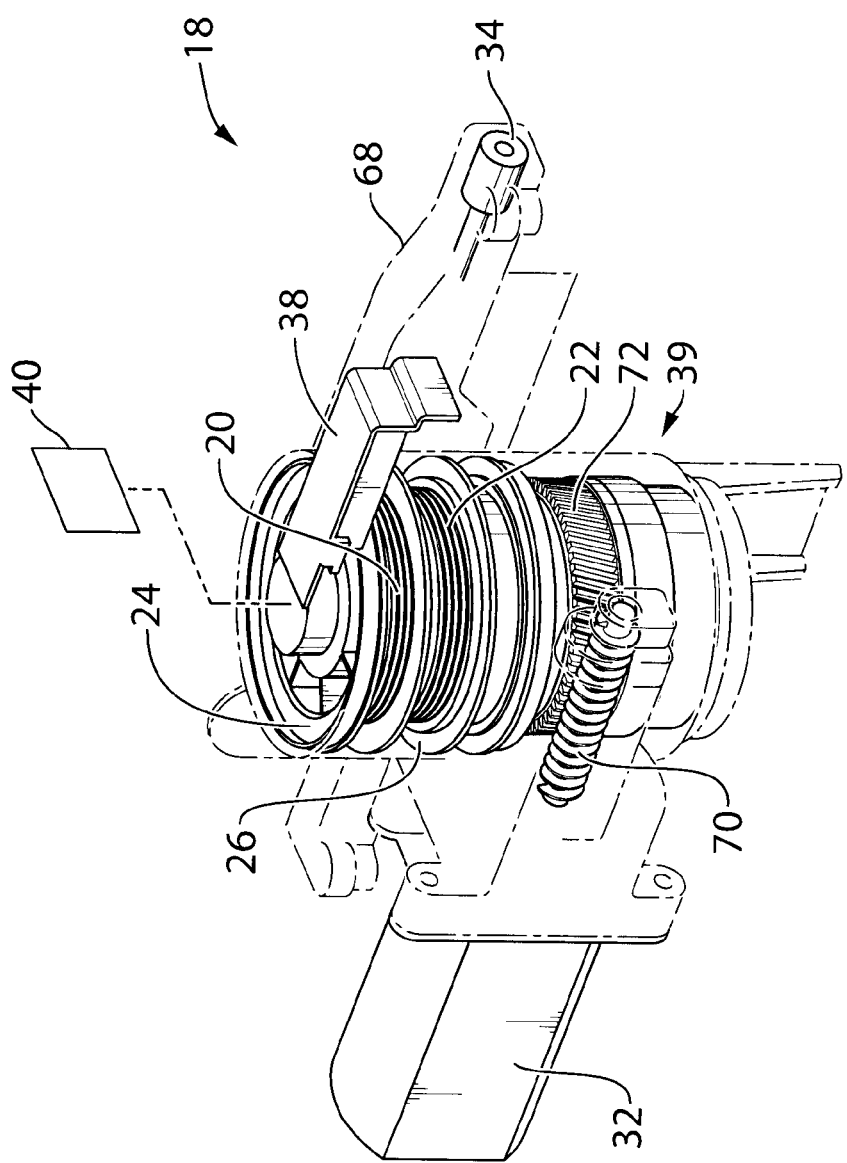
FIG. 3A is a perspective view of a variant of the sliding door drive assembly shown in FIG. 2.

Reference is made to FIG. 1, which shows a vehicle 12. The vehicle 12 includes a vehicle body 14 and a sliding door 16. The vehicle may optionally include a second sliding door 16 on the other side of the vehicle body 14. The sliding door 16 is a power sliding door and is movable between a closed position (FIG. 1) and an open position by means of a sliding door drive assembly 18 (FIG. 2) and first and second cable segments 20 and 22. As shown in FIG. 3A, the drive assembly 18 includes, among other things, first and second drums 24 and 26 to which the cable segments 20 and 22 are respectively connected. It will be noted that, in the embodiment of the drive assembly 18 shown in FIG. 2, both cable segments 20 and 22 extend out from the front end of the drive assembly 18, and then towards the front edge of the door 16 one cable segment is directed rearwardly. This embodiment is shown in FIG. 3C. However in the drive assembly 18 shown in FIG. 3A, a minor variant is shown where one cable segment extends forwardly and one cable segment extends rearwardly. Aside from this minor difference, the two versions of the drive assembly 18 may be substantially the same.

By rotating the cable drums shown at 24 and 26 (FIG. 3A) in a first or a second direction to control the winding and unwinding of the cable segments 20 and 22 on and from the drums 24 and 26, the sliding door drive assembly 18 drives the sliding door 16 towards the open or closed positions. In the embodiment shown in FIG. 2, the sliding door drive assembly 18 is shown as being mounted in the sliding door 16, and the free ends (shown at 28 and 30) of the cable segments 20 and 22 are shown as being mounted to the vehicle body 14. It is alternatively possible however for the sliding door drive assembly 18 to be mounted to the vehicle body 14 and for the free ends 28 and 30 of the cable segments 20 and 22 to be mounted to the sliding door.

FIGS. 3A and 3B show views of slightly different variants of the sliding door drive assembly 18. As best seen in FIG. 3A, the sliding door drive assembly 18 includes a motor 32, the aforementioned first and second cable drums 24 and 26 which are driven by the motor 32 about an axis A, a first cable guide 34, a second cable guide 36, a position sensor 38, a clutch 39, a control system 40 and a tensioning system 42 (best seen in FIG. 4A).

Figure 4A:
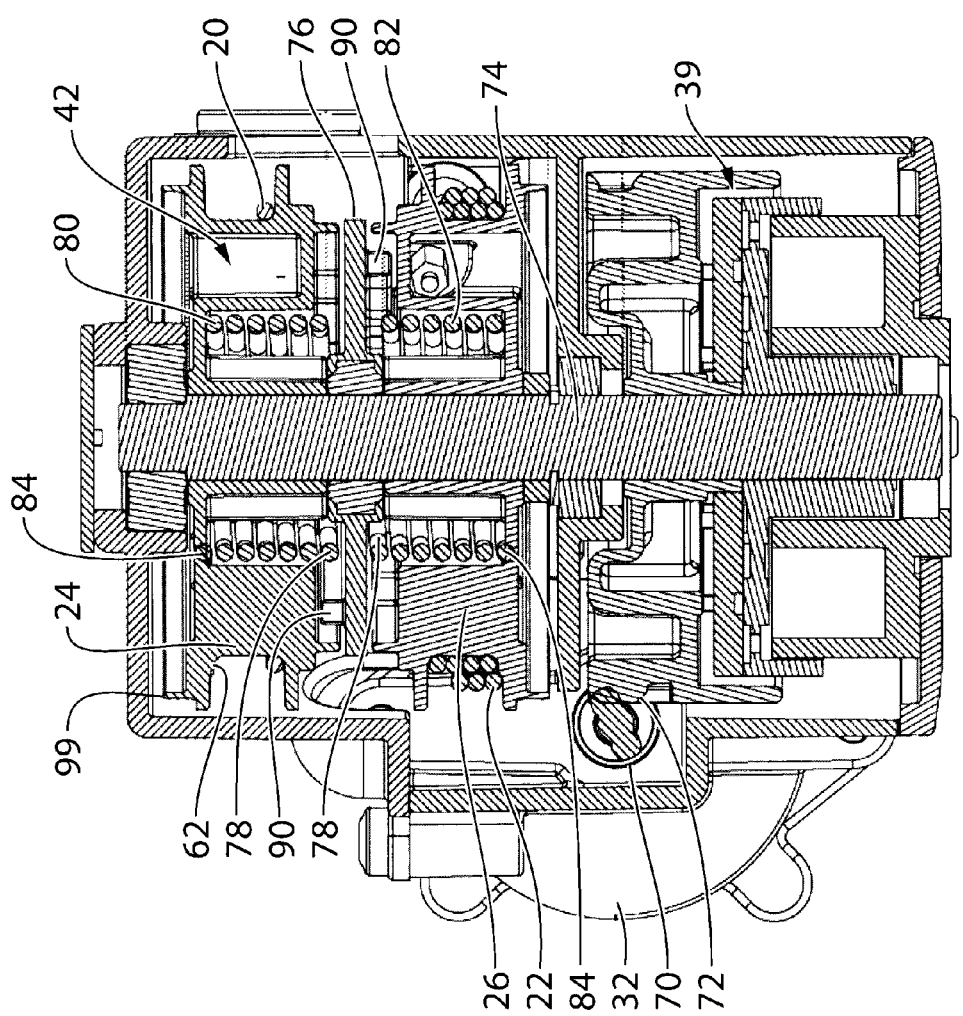
FIG. 4A is a sectional view along section lines 4-4 of the sliding door drive assembly shown in FIG. 3A.
Figure 5:
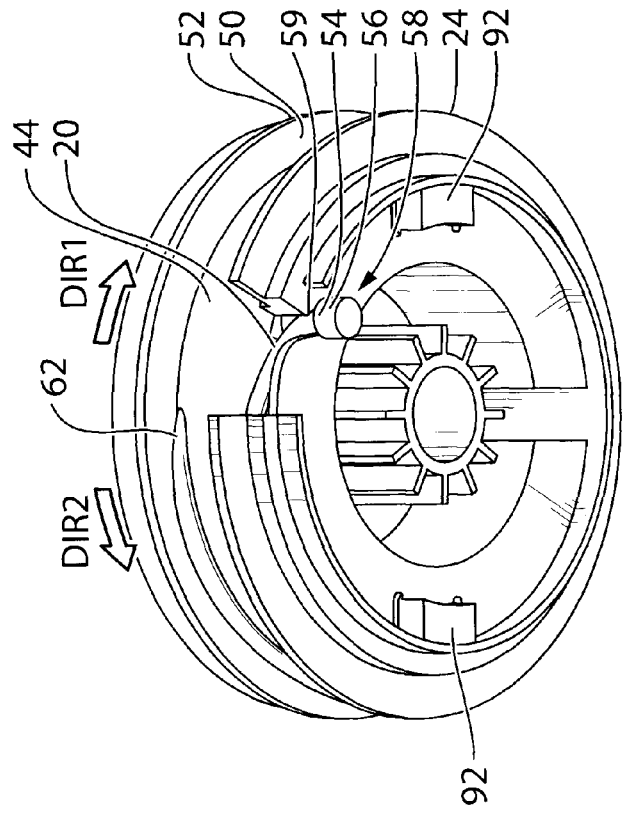
FIG. 5 is a perspective view of a first cable drum that is part of the sliding door drive assembly shown in FIG. 2.
Figure 4B:
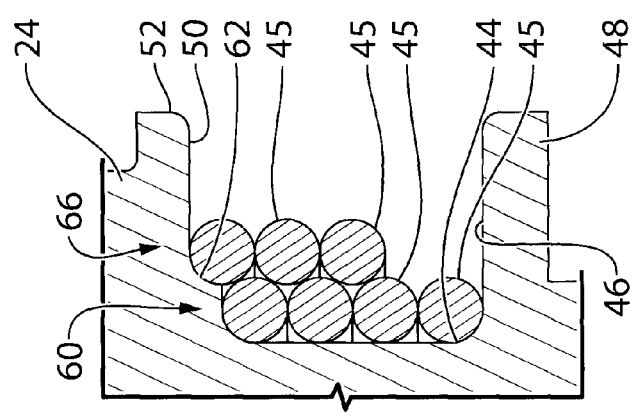
FIG. 4B is a highly magnified view of a portion of the sectional view of the sliding door drive assembly shown in FIG. 4A.

Referring to FIGS. 4B and 5, the first cable drum 24 includes a cable wrap surface 44 that is receives a plurality of wraps 45 of the first cable segment 20 thereon. The cable wrap surface 44 has a first axial edge 46 bounded by a first flange 48, and a second axial edge 50 bounded by a second flange 52. A first end 54 of the first cable segment 20 is mounted to the first cable drum 24 by any suitable means. In the embodiment shown in FIG. 5, a ferrule 56 on the first end 54 is held in an aperture 58 on the first cable drum 24. A pass-through slot 59 permits the pass-through of the first cable segment 20 from the aperture 58 onto the cable wrap surface 44. The first end 56 of the first cable segment 20 may be referred to as a fixed end 56. As can be seen the fixed end 56 of the first cable segment 20 is positioned along the first axial edge 56 of the first drum 24.

To wind the first cable segment 20 on the cable wrap surface 44 the first drum 24 is rotated in a first selected rotational direction DIR1. It will be noted that the cable wrap surface 44 is ungrooved. As shown in FIGS. 6A and 6B, the first cable guide 34 is oriented generally perpendicularly to the axis A and is positioned to bias the first cable segment 20 as it passes therethrough (i.e. through a guide aperture or guide slot) towards the first axial edge 46 of the cable wrap surface 44 so as to ensure that each successive wrap 45 is positioned snuggly against the wrap 45 next to it. As successive wraps 45 are laid the first cable segment 20 eventually reaches the second axial edge 50 having completed a first layer 60 of wraps 45 on the cable wrap surface 44. At the second axial edge 50 a first cable drum ramp 62 is positioned to guide one of the wraps 45 of the first cable segment 20 radially above the cable wrap surface 44 and onto the completed first layer 60 of wraps 45. Thus, when the first cable segment 20 reaches the ramp 62, it is guided radially outwards. By virtue of the angle of the first cable segment 20 it then crosses over onto the first layer 60 of wraps 45 and starts a second layer 66 of wraps 45. In the embodiment shown, the movement of the vehicle door 16 between the open and closed positions involves about four wraps 45 in the first layer 60 and about three further wraps 45 in the second layer 66.

The second cable drum 26 co-rotates with the first cable drum 24 and may be substantially identical to the first cable drum 24 except that, when the first and second cable drums 24 and 26 rotate in the first selected rotational direction DIR1 the first cable drum 24 winds the first cable segment 20 thereon, while the second cable drum 26 unwinds the second cable segment 22 therefrom, and when the first and second cable drums 24 and 26 rotate in a second selected rotational direction DIR2 (which is opposite the first selected rotational direction DIR1) the first cable drum 24 unwinds the first cable segment 20 therefrom, while the second cable drum 26 winds the second cable segment 22 thereon.

With reference to FIGS. 3A and 4A, the connection of the motor 32 to the first and second cable drums 24 and 26 is as follows. The motor 32 drives a worm 70, which in turn drives a worm gear 72. The worm gear 72 is connected to an output shaft 74 (FIG. 4A) through the clutch 39, which may be any suitable type of clutch, such as a friction plate clutch. The output shaft 74 drives a drive member 76 which may be referred to as a drive plate 76. The drive plate 76, in turn, drives the first ends 78 of first and second tensioner springs 80 and 82 respectively (which are torsion springs in the embodiment shown in FIG. 4A). The springs 80 and 82 have second ends 84 through which the springs 80 and 82 drive the first and second cable drums 24 and 26. To limit the amount of flexure that the springs 80 and 82 can incur, if the drive plate 76 rotates by more than a selected angle relative to the first and second drums 24 and 26, first drive lugs shown at 90 (FIG. 4A) on the drive plate 76 engage second drive lugs 92 (FIG. 5) on each of the first and second drums 24 and 26. This prevents potential damage to the springs 80 and 82 from overflexure. The springs 80 and 82 make up the tensioning system 42.

To drive the vehicle door 16 towards the open position, the control system 40 (FIGS. 3A and 3B) operates the motor 32 to drive the first and second cable drums 24 and 26 in the first selected rotational direction DIR1, thereby winding the first cable segment 20 onto the first cable drum 24 and unwinding (i.e. letting out) the second cable segment 22 from the second cable drum 26, which drives (i.e. pulls) the vehicle door 16 along the first cable segment 20 towards the open position. To drive the vehicle door 16 towards the closed position, the control system 40 operates the motor 32 to drive the first and second cable drums 24 and 26 in the second selected rotational direction DIR2, thereby winding the first cable segment 20 onto the first cable drum 24 and unwinding (i.e. letting out) the second cable segment 22 from the second cable drum 26, which drives (i.e. pulls) the vehicle door 16 along the first cable segment 20 towards the open position.

The first and second cable guides 34 and 36 (FIGS. 3A and 3B) may form part of a housing 68 that houses the first and second cable drums 24 and 26.

In grooved drums of the prior art, the drums can be prone to jamming when the cables get snagged between the edges of the walls between the grooves, and the inner face of the housing. Furthermore the cables can in some cases get tangled and can be difficult to untangle. By contrast, with the grooveless drums 24 and 26 the cables are less likely to cause interference and jamming of the drums because the drums 24 and 26 do not have grooves and therefore do have walls that separate any grooves. Furthermore, in the event that the cable segments get tangled or otherwise out of position, the problem is likely to correct itself when the cable segments are unwound from the drum when the door 16 is next actuated. It was found, surprisingly, after many hours of testing an example of the drive assembly in accordance with an embodiment of the present invention, that it was more reliable than a similar structure using a grooved drum.

Furthermore by permitting the second layer of cable on the drums 24 and 26, the drums 24 and 26 take up less space axially than corresponding single-layered drums would.

Figure 7:
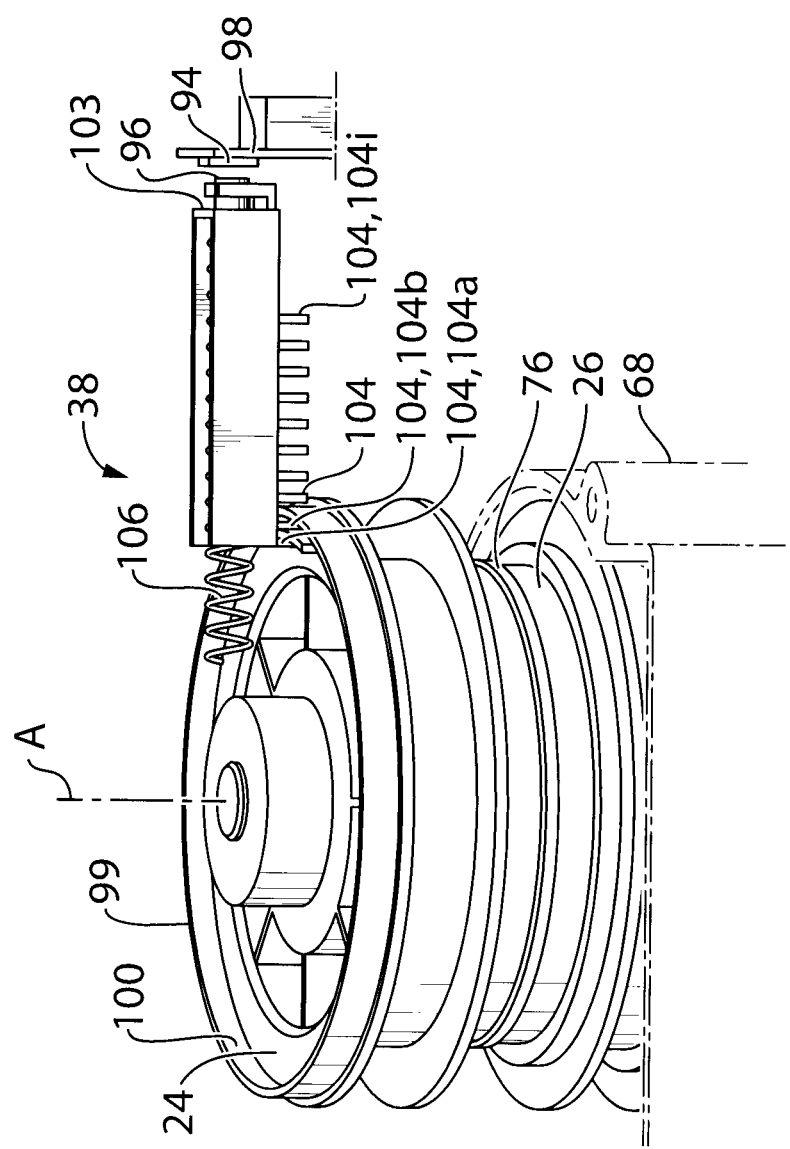
FIG. 7 is a perspective view of the first cable drum with a position sensor therefor.
Figure 8:
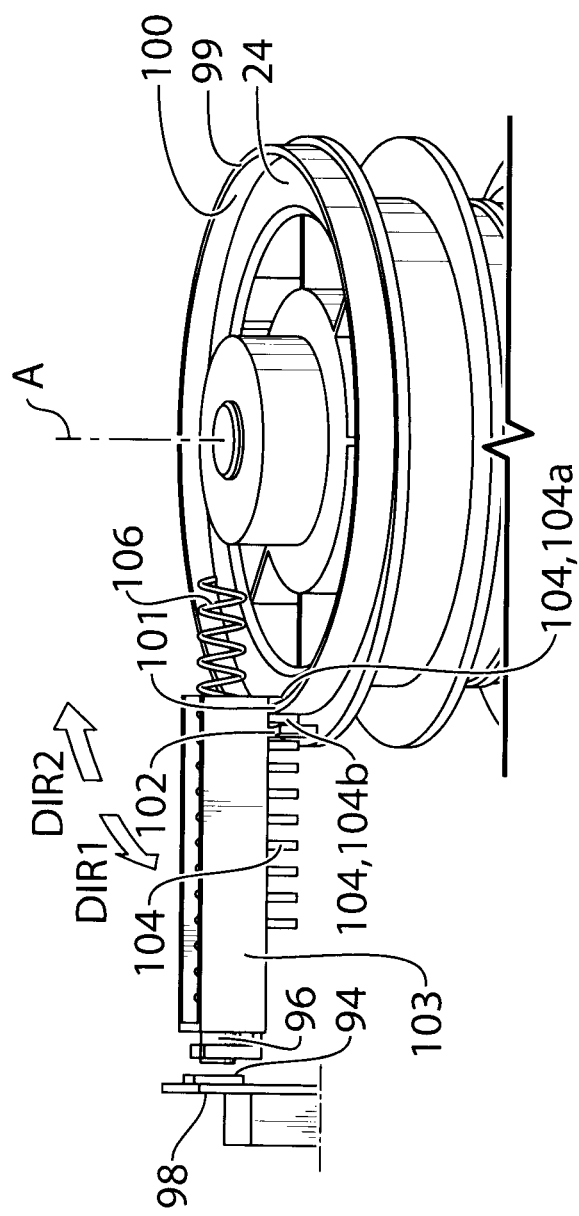
FIG. 8 is another perspective view of the first cable drum and the position sensor.
Figure 9:
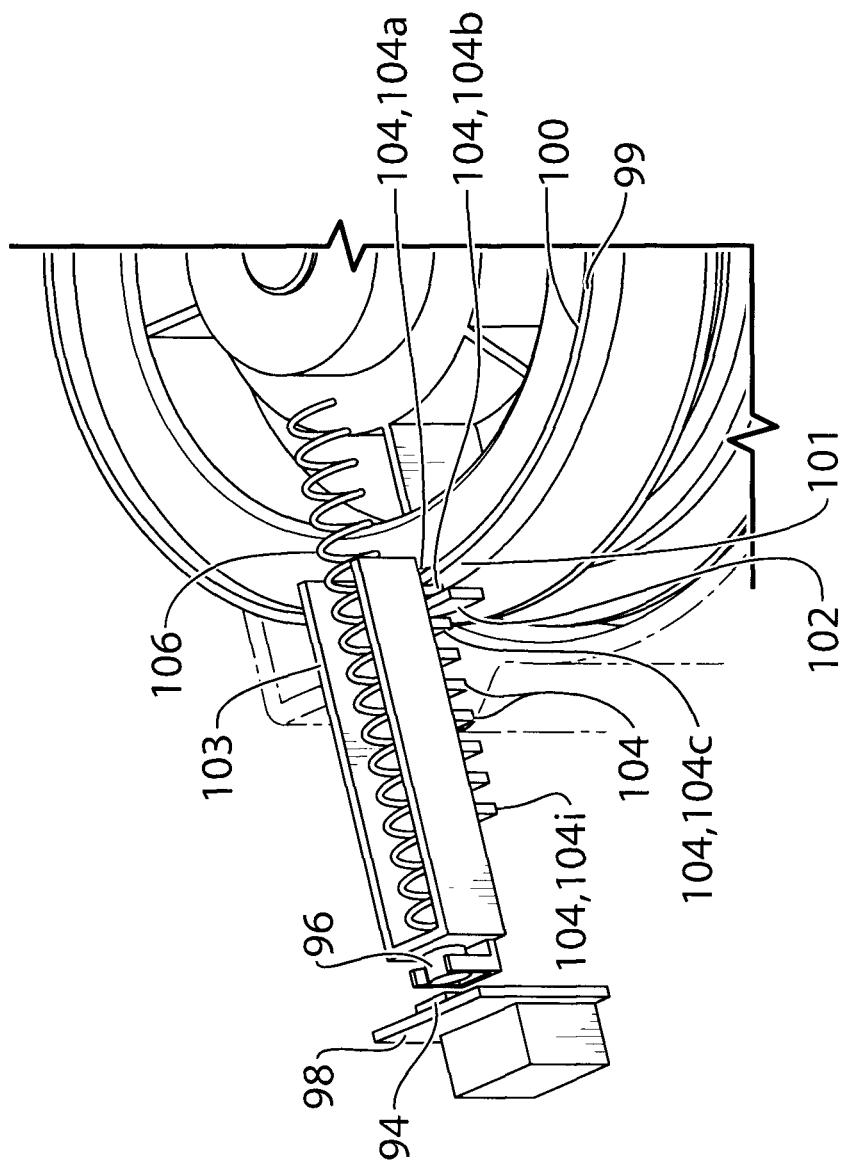
FIG. 9 is a magnified view of a portion of the position sensor.

Reference is made to FIGS. 7, 8 and 9, which show the position sensor 38. The position sensor 38 is an absolute position sensor and includes a first sensor element 94 and a second sensor element 96. The first sensor element 94 is stationary, in the sense that it is mounted fixedly relative to the motor 32. The first sensor element 94 may, for example, be mounted on a printed circuit board (PCB) 98. The first sensor element 94 is configured to sense the position of the second sensor element 96 and to send signals to the control system 40 that are indicative thereof. The second sensor element 96 is drivable through a range of positions by a sensor drive surface 100 on the first drum 24. The sensor drive surface 100 may be a radially inner surface of a lip 99 and extends circumferentially about the axis A. The radial distance of the sensor drive surface 100 from the axis A varies throughout its circumferential length (i.e. its distance from the axis A varies long its circumferential length). Preferably, its distance from the axis A is unique for every angular position along its length. As a result, the position of the second sensor element 96 will be unique for any angular position of the first cable drum 24. As a result, the angular position of the first cable drum 24 can be determined directly from the position of the second sensor element 96. In the embodiment shown in FIGS. 7, 8 and 9, the sensor drive surface 100 has a spiral shape about the axis A and extends throughout an angular range of more than 360 degrees about the axis, such that it has a first end portion 101 and a second end portion 102 that is positioned radially outboard of the first end portion 101 and overlaps circumferentially with the first end portion 101, and has a selected radial spacing from the first end portion 101. These overlapping end portions 101 and 102 are described further below.

In the embodiment shown in FIGS. 7, 8 and 9, the second sensor element 96 is mounted to a drive surface engagement member 103 that includes a plurality of axially extending teeth 104 that engage the sensor drive surface 100. The teeth 104 include a first tooth 104a, a second tooth 104b, a third tooth 104c and so on, to a final tooth 104i. Each successive tooth 104 is positioned successively radially outboard from the previous tooth 104, and has a selected tooth-to-tooth distance D. Thus, the second tooth 104b is positioned radially outboard from the first tooth 104a and has a tooth-to-tooth distance from the first tooth 104a that matches the spacing between the first and second end portions 101 and 102 of the sensor drive surface 100, so that when the first tooth 104a is engaged with the first end portion 101 the second tooth 104b is engaged with the second end portion 102. Such a position is shown in FIGS. 7, 8 and 9. Rotation of the sensor drive surface 100 from this position in the second selected rotational direction DIR2 eliminates engagement of the second tooth 104b with the sensor drive surface 100, such that the drive surface engagement member 103 is engaged with the sensor drive surface 100 only through the first tooth 104a. Rotation of the sensor drive surface 100 from this position in the first selected rotational direction DIR1 eliminates engagement of the first tooth 104a with the sensor drive surface 100, such that the drive surface engagement member 103 is engaged with the sensor drive surface 100 only through the second tooth 104b. Further rotation of the sensor drive surface 100 through another 360 degrees in the first selected rotational direction DIR1 will transfer engagement from the second tooth 104b to the third tooth 104c, and so on. As each successive tooth 104 becomes engaged with the sensor drive surface 100, the drive surface engagement member 102 shuttles through an associated range of positions that bring it farther from the first sensor element 94. With this arrangement, any angular position of the first cable drum 24 throughout a selected number of rotations represents a unique position of the drive surface engagement member 102 and therefore of the second sensor element 96 relative to the first sensor element 94. Thus the control system 40 is capable of determining the position of the vehicle door 16 based solely on the signal sent from the position sensor 38 that is indicative of the position of the second signal element 96. By contrast some systems of the prior art use sensors to count rotations of a tooth or some other element on a rotating member and determine the position of the door based on the number of rotations that were counted during movement of the door from an end position (e.g. from the closed position of the door). The number of rotations is typically stored in volatile memory in such prior art systems. With such systems, however, if there is a power failure or the like while the door is in an open or partially open state, the associated control system would not be able to determine the position of the door, since it would no longer have the count value stored in its memory. Furthermore, if the door were manually opened while there was no power, such prior art systems would not be capable of determining the position of the door when power was restored. With the absolute position sensor 38 however, the control system 40 can determine the position of the door 16 whenever power is restored based solely on the position of the second sensor element 96 relative to the first sensor element 94.

A drive surface engagement member biasing member 106 that is positioned to bias the teeth 104 into engagement with the sensor drive surface 100. In the embodiment shown, the biasing member 106 is a compression spring, however, it will be noted that the biasing member may be a tension spring and may be configured to pull the drive surface engagement member 102 towards a radially outer surface of the lip 99, in which case the radially outer surface would constitute the sensor drive surface 100. Alternatively any other suitable type of biasing member may be used.

In the figures the free end of the biasing member 106 (i.e. the end that extends out of the drive surface engagement member 103) is not shown as being engaged with anything. This is because it is engaged with a portion of the housing 68 that has been cut away to reveal the drums 24 and 26 and the components that make up the position sensor 38.

Based on the signals from the position sensor 38 (and optionally on other signals from other sensors) the control system 40 can control the opening and closing of the door 16 in any suitable way and can stop the door 16 at any suitable position and can stop or start the motor 32 based on any suitable algorithm or criteria.

The first and second sensor elements 94 and 96 may be any suitable type of sensor elements such as a Hall effect sensor and a magnet respectively. In general, the first and second sensor elements 94 and 96 are configured such that the first sensor element 94 is suitable for detecting the proximity of the second sensor element 96 thereto.

Figure 12:
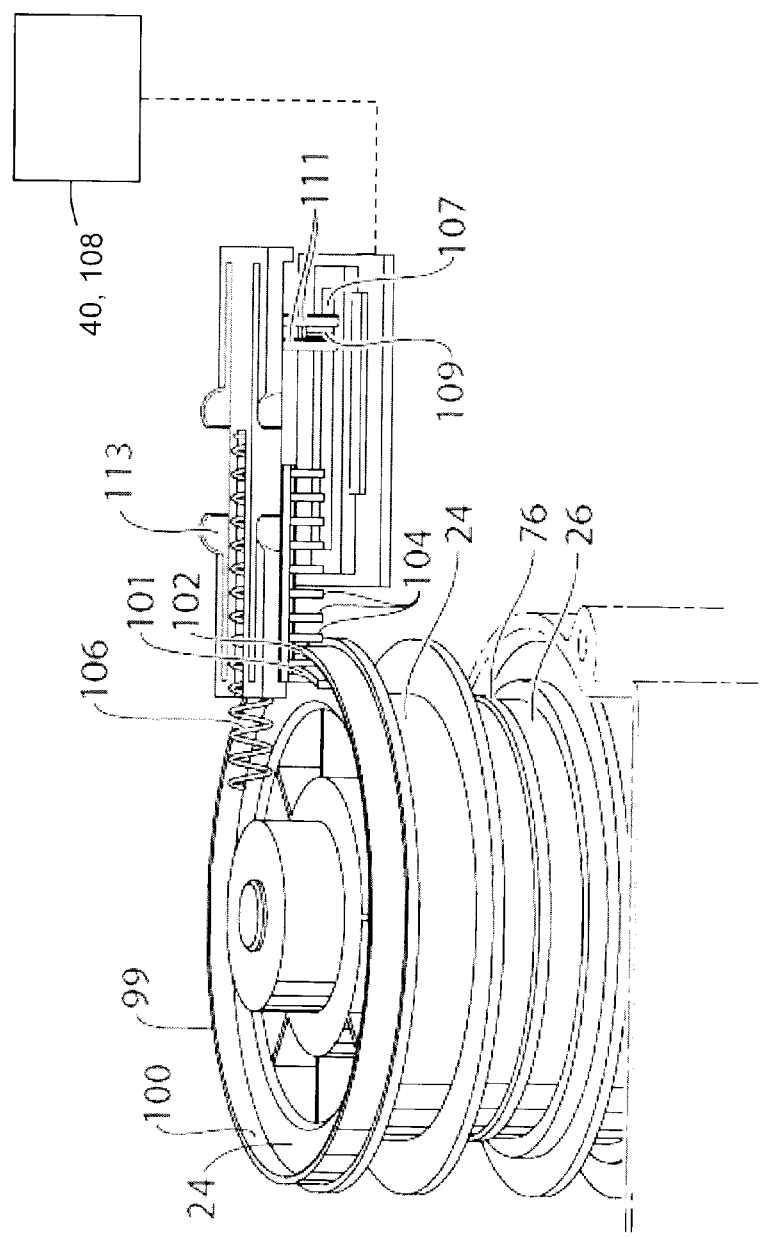
FIG. 12 is perspective view of another absolute position sensor that can be used as part of the sliding door drive assembly shown in FIG. 2.

In another embodiment, shown in FIG. 12, the position sensor includes a resistive element 107. The first sensor element is shown at 108 and includes an ohmeter which may simply be a function that is incorporated into the control system 40 and the second sensor element is shown at 109 and is a sliding contact that slides on the resistive element 107. The sliding contact is captured between two sliding contact capture teeth 111 on the drive surface engagement member which is shown at 113. As the sliding contact is moved along the resistive element 107 by movement of the drive surface engagement member 113, the resistance measured by the ohmeter changes. The position shown in FIG. 12 may otherwise be similar to the position sensor shown in FIGS. 7-9. As part of the position sensor shown in FIG. 12, there may be a Hall effect sensor (not shown) provided for detecting a magnet (not shown) that is provided on a rotating member that is driven by the motor 32.

In the embodiments shown, the first and second cable segments 20 and 22 are shown as two separate cables. It will be understood however, that the two cable segments 20 and 22 could be connected to each other via a length of cable, such that the two cable segments would form part of a single cable.

While the position sensor 38 has been described in the context of a drive assembly for a vehicle sliding door, it is possible for the position sensor 38 to be used on any suitable rotating member, an in particular a rotating member that would benefit from having its absolute position be known throughout a plurality of rotations.

Figure 10:
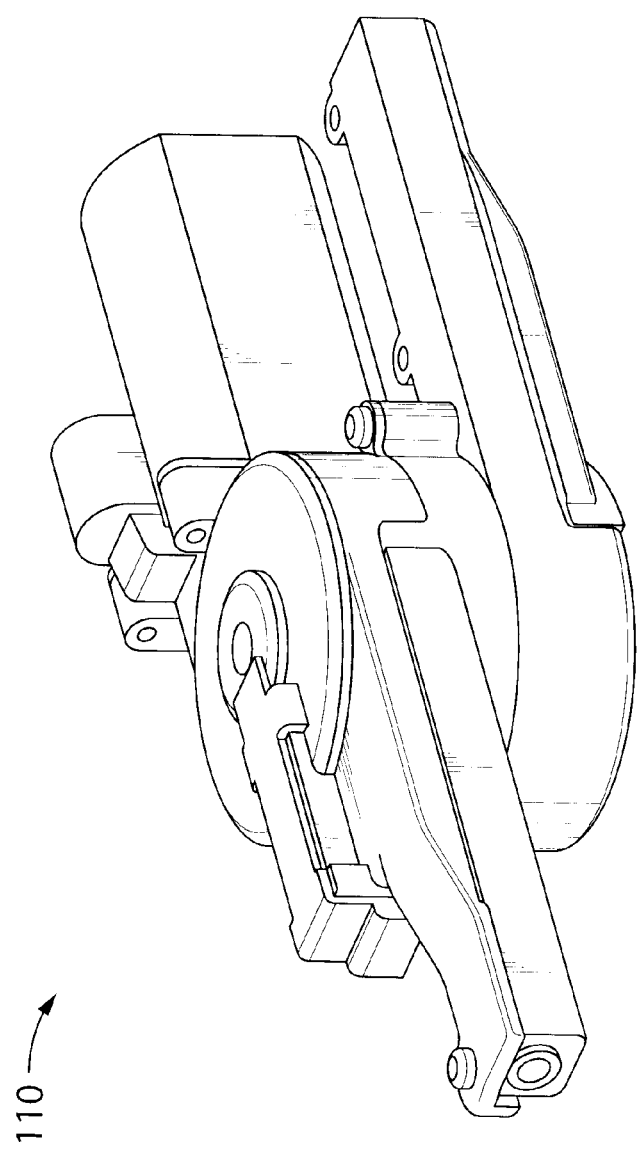
FIG. 10 is a perspective view of another variant of the sliding door drive assembly shown in FIG. 2.
Figure 11:
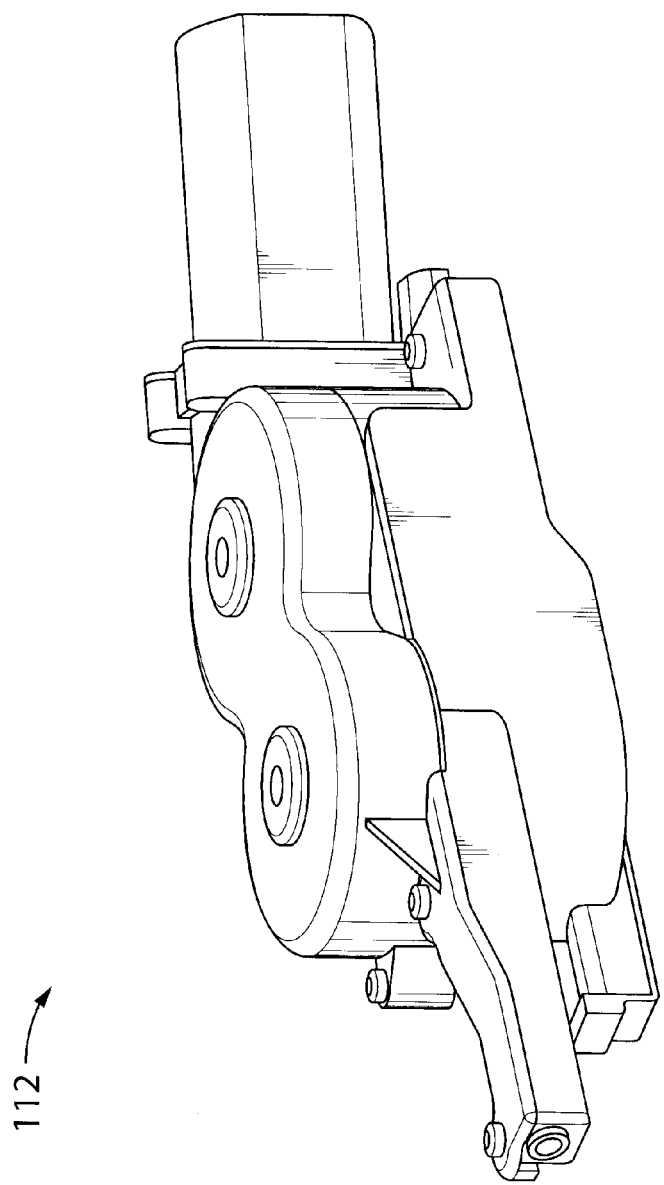
FIG. 11 is a perspective view of another variant of the sliding door drive assembly shown in FIG. 2.

FIGS. 10 and 11 show other variants of the drive assembly at 110 and 112 respectively. In FIG. 10 the drive assembly 110 lacks a clutch. In FIG. 11, the clutch is provided but is positioned along a different axis than that of the first and second drums so as to provide the drive assembly 112 with a lower axial length overall.

While it is considered less advantageous, in embodiments wherein the drums are grooveless and have the cable guides positioned to bias the cable segments towards the first axial edge of the cable wrap surfaces it is possible for the cable drums 24 and 26 to omit the cable drum ramps and to be configured to only receive a single layer of wraps 45 of cable.

Conversely, while also considered less advantageous, in embodiments wherein the cable drum ramps are provided on the drums 24 and 26 and the drums are wound with two or more layers of cable, the drums 24 and 26 may be grooveless, as shown, or for the drums to instead have grooves for the cables.

Throughout this disclosure the drum that is axially spaced farther away from the clutch 39 and that has the sensor drive surface 99 on it has been referred to as the first cable drum 24, and the other drum has been referred to as the second cable drum. It is alternatively possible however, for the other drum to be referred to as the first drum and for the drum that is spaced farther from the clutch and with the sensor drive surface to be referred to as the second drum.

The first and second drums 24 and 26 have been shown as two entirely separate drums that are engaged by the drive plate 76 through the springs 80 and 82. In an alternative embodiment, the first and second drums 24 and 26 could be integrally connected to each other.

While the above description constitutes a plurality of embodiments of the present disclosure, it will be appreciated that the present disclosure is susceptible to further modification and change without departing from the fair meaning of the accompanying claims.

The invention claimed is:

1. A sliding door drive assembly for a motor vehicle with a sliding door and a vehicle body, the sliding door drive assembly comprising: a motor; a first cable drum that is rotatable by the motor about an axis, and that has a cable wrap surface for receiving a first cable segment thereon, wherein the first cable drum further includes a sensor drive surface that extends axially; and a first sensor element and a second sensor element, wherein the first sensor element is mountable fixedly relative to the motor, wherein the second sensor element is drivable linearly through a range of positions by the sensor drive surface, wherein the first sensor element is configured to send signals to a control system that are indicative of the position of the second sensor element.

2. A sliding door drive assembly as claimed in claim 1, wherein the sensor drive surface extends circumferentially about the axis and has a circumferential length, and has a radial distance from the axis that varies throughout the circumferential length.

3. A sliding door drive assembly as claimed in claim 2, wherein the second sensor element is mounted to a drive surface engagement member that includes a first axially extending tooth that engages the sensor drive surface.

4. A sliding door drive assembly as claimed in claim 3, wherein the sensor drive surface has a spiral shape about the axis.

5. A sliding door drive assembly as claimed in claim 4, wherein the sensor drive surface extends throughout an angular range of more than 360 degrees about the axis.

6. A sliding door drive assembly as claimed in claim 5, wherein the sensor drive surface has a first end portion and a second end portion that is positioned radially outboard of the first end portion and overlaps circumferentially with the first end portion, wherein the drive surface engagement member further includes a second tooth positioned radially outboard of the first tooth relative to the axis, wherein when the first tooth is engaged with the first end portion the second tooth is engaged with the second end portion, and wherein rotation of the sensor drive surface in a first direction eliminates engagement of the first tooth with the sensor drive surface and wherein rotation of the sensor drive surface in a second direction eliminates engagement of the second tooth with the sensor drive surface.

7. A sliding door drive assembly as claimed in claim 3, further comprising a drive surface engagement member biasing member that is positioned to bias the first tooth into engagement with the sensor drive surface.

8. A sliding door drive assembly as claimed in claim 1, wherein the first sensor element is a magnetic field sensing device and the second sensor element is a magnet.

9. A sliding door drive assembly as claimed in claim 2, wherein the first sensor element includes an ohmmeter and the second sensor element is a sliding contact that is engaged with a resistive element.

10. A sliding door drive assembly as claimed in claim 9, wherein the ohmmeter is part of the control system.

\* \* \* \* \*

UNITED STATES PATENT AND TRADEMARK OFFICE
CERTIFICATE OF CORRECTION

| | | |
|---|---|---|
| PATENT NO. | : 8,950,117 B2 | Page 1 of 1 |
| APPLICATION NO. | : 13/983322 | |
| DATED | : February 10, 2015 | |
| INVENTOR(S) | : Nebojsa Djordjevic and Kristopher B. Rogers | |

It is certified that error appears in the above-identified patent and that said Letters Patent is hereby corrected as shown below:

In the Claims

In Claim 9, "as claimed in claim 2," should be changed to read: "as claimed in claim 1,".

Signed and Sealed this
Seventh Day of July, 2015

Michelle K. Lee
*Director of the United States Patent and Trademark Office*